Sept. 27, 1966 L. KRANTZ 3,274,617

BELT STRUCTURE HAVING SWIVEL MEANS

Filed May 6, 1965

INVENTOR
LEON KRANTZ
BY Mark Basseches
ATTORNEY

United States Patent Office 3,274,617
Patented Sept. 27, 1966

3,274,617
BELT STRUCTURE HAVING SWIVEL MEANS
Leon Krantz, Jamaica, N.Y., assignor to Monsanto Company, St. Louis, Mo., a corporation of Delaware
Filed May 6, 1965, Ser. No. 453,699
2 Claims. (Cl. 2—301)

This invention relates to a belt structure, and more particularly to a belt structure having swivel means.

It is known to provide a belt, such as a trouser belt, wherein there is provided swivel means between the buckle portion and the remainder of the waist encircling component of the belt. In such an arrangement, the obverse and reverse waist encircling portions are different, i.e. they may be formed, respectively, of black and brown leathers, for example. The swivel connection permits the encircling portion to be reversed, thereby to match the exposed face of the belt with the costume of the wearer. Such known swivel constructions have, in the past, provided problems, both by reason of the expense of fabricating the swivel and by reason of the unattractive appearance provided by the swivel.

Typical prior swivels have included metal members clamped to a short length of belting fixed to the buckle and to the remaining length of belting with a pivot spanning the metal portions. Such arrangement has been costly and unsightly.

Accordingly, it is an object of the present invention to provide a decorative belt with an improved swivel connection between the buckle and the belting.

A further object of the invention is to provide a reversible belt wherein the swivel connection does not detract from the appearance of the article.

To attain these objects and such further objects as may appear herein or be herein after pointed out, I make reference to the accompanying drawings, forming a part hereof, in which.

Figure 1:
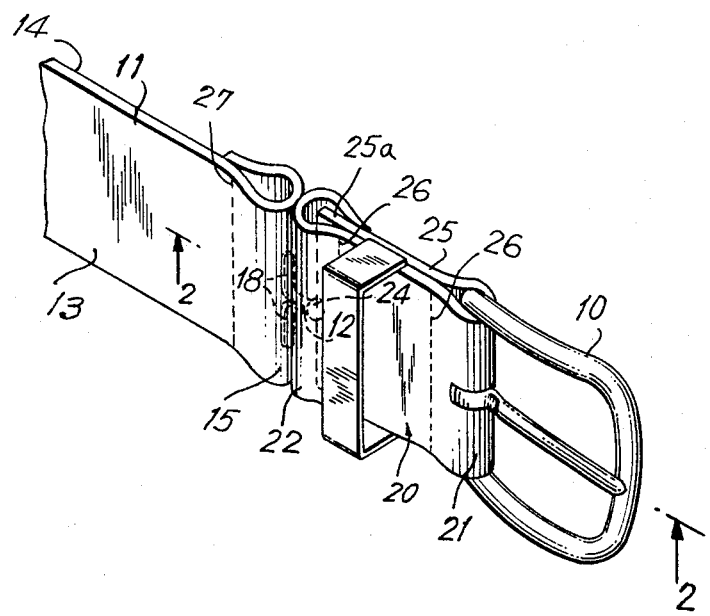
FIGURE 1 is a perspective view of a belt in accordance with the invention.
Figure 2:
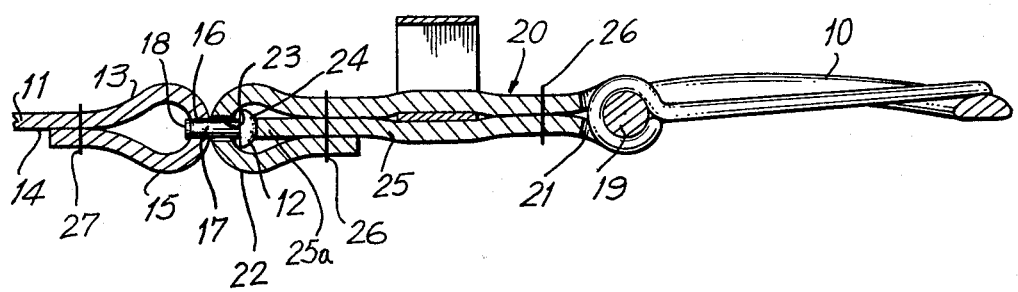
FIGURE 2 is a section taken on the line 2—2 of FIGURE 1.

Referring now to the drawings, there is shown in FIGURE 1 a conventional buckle assembly 10 connected to a waist encircling belt component 11 by a rivet member 12.

Preferably one face 13 of the belt member is made of a material contrasting with that of the opposite face 14 of the belt member, so that when the relationship between the buckle assembly 10 and the main belt component 11 is reversed, the belt provides a distinctly different appearance.

In accordance with the invention, the belt section 11, at the bight portion 15, is apertured as at 16, and a shank portion 17 of the rivet 12 passes through this opening.

The rivet includes legs 18, 18, which are spread apart, as shown in FIGURE 1, so as positively to prevent any relative rotation between the rivet component and the belt portion 11.

The buckle member 10 includes a connector shank portion 19 which is embraced within a connector portion 20, which secures the buckle to the rivet. The connector portion 20, which preferably comprises a short length of belting, is formed into a bight 21 which encircles the shank 19, and a second bight 22 spaced from the first bight. An aperture 23 is formed in the area of the bight 22.

The rivet 12 includes a circular head 24, the rivet being assembled in the apertures 23 and 16 prior to the spreading of the legs 18. Thus, the circular head 24 lies adjacent the aperture 23.

A flap portion 25 of the connector portion 20 is disposed closely adjacent to the circular head 24 of the rivet 12.

With the parts positioned in the manner set forth and after the legs 18 have been spread, the structure may be permanently secured together as by a line or lines of stitching 26, 27.

The positioning of the end 25a of the flap 25 closely adjacent to the head 24 of the rivet 12 is an important feature of my invention. Specifically, by thus positioning the flap 25a, a spacing is provided between the sections of material to either side of the aperture 23. It will thus be observed that the two side surfaces may not be unduly tightly compressed against said head. The importance of this feature will be readily appreciated in view of the fact that all swiveling must be effected by a relative rotation of the section 20 about the rivet, since the legs 18 positively prevent rotation of the rivet with respect to the belt section 11.

Under such circumstances, the thickness of portion 25a prevents the head of the rivet from cutting too deply into the leather components of section 20 under the influence of continued swiveling of the component 20 relative to the rest of the belt.

Also, by disposing the end 25a of the flap 25 immediately adjacent the head 24, relative longitudinal movement between the rivet and the belt section 20 is eliminated.

Having thus described the invention and illustrated its use, what I claim as new and desire to secure by Letters Patent is:

1. A belt comprising a body circling portion and a buckle carrying portion, a loop formed adjacent one end of said body encircling portion, an aperture formed in said loop, a rivet member having a shank passing through said aperture and having leg portions disposed within said loop, said leg portions being laterally spaced apart to prevent relative rotation of said rivet member and body encircling portion, a circular head on said rivet member spaced from said legs, a short length of material of substantial thickness having a buckle fixed at one end and having a bight portion at the other end, a second aperture formed in said bight portion, said shank of said rivet member passing through said second aperture and said circular head of said rivet member lying adjacent said second aperture, an end portion of said short length of belting material being disposed adjacent the head of said rivet member, thereby to space apart the portions of said short section defining said bight, and fastening means passing through said portions defining said bight and said end portion.

2. A device in accordance with claim 1 wherein the thickness of said end poriton is greater than half of the diameter of said circular head.

References Cited by the Examiner
UNITED STATES PATENTS

| | | | |
|---|---|---|---|
| 629,507 | 7/1889 | Janton | 2—301 |
| 670,726 | 3/1901 | Pierce | 2—339 X |
| 3,026,533 | 3/1962 | Zakarin | 2—301 |

JORDAN FRANKLIN, *Primary Examiner.*
G. V. LARKIN, *Assistant Examiner.*